US006253256B1

(12) United States Patent
Wollrath et al.

(10) Patent No.: US 6,253,256 B1
(45) Date of Patent: Jun. 26, 2001

(54) DEFERRED RECONSTRUCTION OF OBJECTS AND REMOTE LOADING IN A DISTRIBUTED SYSTEM

(75) Inventors: Ann M. Wollrath, Groton; James H. Waldo, Dracut; Kenneth C. R. C. Arnold, Lexington; Peter C. Jones, Winchester, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/950,756

(22) Filed: Oct. 15, 1997

(51) Int. Cl.[7] .................................................. G06F 13/00
(52) U.S. Cl. .............................................................. 709/330
(58) Field of Search ............................. 395/684, 200.33; 709/304, 203, 330; 707/101

(56) References Cited

U.S. PATENT DOCUMENTS

| 4,491,946 | 1/1985 | Kryskow, Jr. et al. ............. 370/453 |
| 4,713,806 | 12/1987 | Oberlander et al. ............... 370/358 |
| 4,809,160 | 2/1989 | Mahon et al. ...................... 713/200 |
| 4,823,122 | 4/1989 | Mann et al. ..................... 340/825.28 |
| 4,939,638 | 7/1990 | Stephenson et al. ............... 710/244 |
| 4,956,773 | 9/1990 | Saito et al. ............................. 717/3 |
| 5,088,036 | 2/1992 | Ellis et al. ............................ 707/206 |
| 5,109,486 | 4/1992 | Seymour ............................... 709/224 |
| 5,187,787 | 2/1993 | Skeen et al. .......................... 709/314 |
| 5,218,699 | 6/1993 | Brandle et al. ....................... 709/328 |

(List continued on next page.)

FOREIGN PATENT DOCUMENTS

| 300 516 A2 | 1/1989 | (EP) . |
| 351 536 A3 | 1/1990 | (EP) . |
| 384 339 A3 | 8/1990 | (EP) . |
| 472 874 A1 | 3/1992 | (EP) . |
| 474 340 A2 | 3/1992 | (EP) . |

(List continued on next page.)

OTHER PUBLICATIONS

Microsoft Press Computer Dictionary, 2nd Edition; p. 276, 1994.*
Alexander et al., "Active Bridging,"Proceedings of the ACM/SIGCOMM'97 Conference, Cannes, France, Sep. 1997.
Anonymous, "Change–Notification Service for Shared Files," IBM Technical Disclosure Bulletin, vol. 36, No. 8, pp. 77–82, XP002108713, New York, US, Aug. 1993.
Anonymous, "Resource Preemption for Priority Scheduling," IBM Technical Disclosure Bulletin, vol. 16, No. 6, p. 1931, XP002109435 New York, US, Nov. 1973.

(List continued on next page.)

Primary Examiner—Kenneth R. Coulter
(74) Attorney, Agent, or Firm—Finnegan, Henderson, Farabow, Garrett & Dunner, L.L.P.

(57) ABSTRACT

A method and system for transmitting objects in an object-oriented distributed system allows the reconstruction of objects and downloading of code associated with such object reconstruction to be deferred until it is needed by a program. The deferred reconstruction is accomplished by using a Java object called a "marshalled object," which is a self-describing stream and which is a first-class entity in the system, meaning that it exists within a type system of a programming language and can be accessed and manipulated by instructions written in that language. Such an object can typically be produced by any object that can be passed from one address space to another, and it can be stored, passed to other objects, or used to reconstruct an object of the original type on demand. The reconstruction of an object is deferred until the code holding a marshalled object directly calls the creation of the object using the marshalled object. Any downloading of code is also deferred until the marshalled object is used to create a copy of the original object.

21 Claims, 6 Drawing Sheets

U.S. PATENT DOCUMENTS

| | | | |
|---|---|---|---|
| 5,257,369 | 10/1993 | Skeen et al. | 709/312 |
| 5,293,614 | 3/1994 | Ferguson et al. | 707/201 |
| 5,297,283 | 3/1994 | Kelly, Jr. et al. | 709/104 |
| 5,307,490 * | 4/1994 | Davidson et al. | 709/328 |
| 5,311,591 | 5/1994 | Fischer | 713/156 |
| 5,339,435 | 8/1994 | Lubkin et al. | 717/11 |
| 5,386,568 | 1/1995 | Wold et al. | 717/10 |
| 5,390,328 | 2/1995 | Frey et al. | 709/315 |
| 5,423,042 | 6/1995 | Jalili et al. | 709/328 |
| 5,440,744 | 8/1995 | Jacobson et al. | 709/203 |
| 5,448,740 | 9/1995 | Kiri et al. | 717/8 |
| 5,455,952 | 10/1995 | Gjovaag | 717/1 |
| 5,471,629 | 11/1995 | Risch | 707/201 |
| 5,475,792 | 12/1995 | Stanford et al. | 704/233 |
| 5,475,817 | 12/1995 | Waldo et al. | 709/316 |
| 5,481,721 | 1/1996 | Serlet et al. | 709/315 |
| 5,504,921 | 4/1996 | Dev et al. | 709/223 |
| 5,511,197 | 4/1996 | Hill et al. | 709/328 |
| 5,524,244 | 6/1996 | Robinson et al. | 717/5 |
| 5,553,282 | 9/1996 | Parrish et al. | 707/10 |
| 5,555,367 | 9/1996 | Premerlani et al. | 707/4 |
| 5,557,789 | 9/1996 | Skeen et al. | 705/35 |
| 5,560,003 | 9/1996 | Nilsen et al. | 707/206 |
| 5,561,785 | 10/1996 | Blandy et al. | 711/170 |
| 5,577,231 | 11/1996 | Scalzi et al. | 703/26 |
| 5,603,031 | 2/1997 | White et al. | 709/317 |
| 5,617,537 | 4/1997 | Yamada et al. | 709/214 |
| 5,628,005 | 5/1997 | Hurvig | 707/8 |
| 5,640,564 | 6/1997 | Hamilton et al. | 709/315 |
| 5,652,888 | 7/1997 | Burgess | 709/318 |
| 5,655,148 | 8/1997 | Richman et al. | 710/8 |
| 5,659,751 | 8/1997 | Heninger | 709/332 |
| 5,671,225 | 9/1997 | Hooper et al. | 370/468 |
| 5,675,796 | 10/1997 | Hodges et al. | 709/100 |
| 5,680,573 | 10/1997 | Rubin et al. | 711/129 |
| 5,680,617 | 10/1997 | Gough et al. | 707/104 |
| 5,684,955 | 11/1997 | Meyer et al. | 709/316 |
| 5,689,709 | 11/1997 | Corbett et al. | 709/315 |
| 5,706,435 | 1/1998 | Barbará et al. | 711/141 |
| 5,724,588 | 3/1998 | Hill et al. | 709/328 |
| 5,727,145 | 3/1998 | Nesset et al. | 713/200 |
| 5,737,607 * | 4/1998 | Hamilton et al. | 717/1 |
| 5,745,678 | 4/1998 | Herzberg et al. | 713/200 |
| 5,745,695 | 4/1998 | Gilchrist et al. | 709/227 |
| 5,745,703 | 4/1998 | Cejtin et al. | 709/238 |
| 5,754,849 * | 5/1998 | Dyer et al. | 707/101 |
| 5,757,925 | 5/1998 | Faybishenko | 709/203 |
| 5,761,656 * | 6/1998 | Ben-shachar | 707/4 |
| 5,764,897 | 6/1998 | Khalidi | 709/201 |
| 5,768,532 | 6/1998 | Megerian | 709/245 |
| 5,774,551 | 6/1998 | Wu et al. | 713/155 |
| 5,778,228 | 7/1998 | Wei | 709/328 |
| 5,778,368 | 7/1998 | Hogan et al. | 707/10 |
| 5,787,425 | 7/1998 | Bigus | 707/6 |
| 5,787,431 | 7/1998 | Shaughnessy | 707/100 |
| 5,809,507 | 9/1998 | Cavanaugh, III | 707/103 |
| 5,813,013 | 9/1998 | Shakib et al. | 707/102 |
| 5,815,149 | 9/1998 | Mutschler, III et al. | 345/335 |
| 5,815,709 | 9/1998 | Waldo et al. | 712/300 |
| 5,815,711 | 9/1998 | Sakamoto et al. | 717/1 |
| 5,829,022 | 10/1998 | Watanabe et al. | 711/118 |
| 5,832,529 | 11/1998 | Wollrath et al. | 707/206 |
| 5,832,593 | 11/1998 | Wurst et al. | 29/750 |
| 5,835,737 | 11/1998 | Sand et al. | 710/113 |
| 5,842,018 | 11/1998 | Atkinson et al. | 707/501 |
| 5,844,553 | 12/1998 | Hao et al. | 345/329 |
| 5,845,129 | 12/1998 | Wendorf et al. | 710/200 |
| 5,860,004 | 1/1999 | Fowlow et al. | 717/1 |
| 5,860,153 | 1/1999 | Matena et al. | 711/216 |
| 5,864,862 | 1/1999 | Kriens et al. | 707/103 |
| 5,864,866 | 1/1999 | Henckel et al. | 707/103 |
| 5,872,928 | 2/1999 | Lewis et al. | 709/222 |
| 5,875,335 * | 2/1999 | Beard | 717/5 |
| 5,878,411 | 3/1999 | Borroughs et al. | 707/4 |
| 5,884,079 | 3/1999 | Furusawa | 717/1 |
| 5,887,134 | 3/1999 | Ebrahim | 709/200 |
| 5,890,158 | 3/1999 | House et al. | 707/10 |
| 5,892,904 | 4/1999 | Atkinson et al. | 713/201 |
| 5,933,497 | 8/1999 | Beetcher et al. | 705/59 |
| 5,935,249 | 8/1999 | Stern et al. | 713/201 |
| 5,946,485 | 8/1999 | Weeren et al. | 717/3 |
| 5,946,694 | 8/1999 | Copeland et al. | 707/103 |
| 5,966,531 * | 10/1999 | Skeen et al. | 709/315 |
| 6,003,763 | 12/1999 | Gallagher et al. | 235/379 |

FOREIGN PATENT DOCUMENTS

| | | |
|---|---|---|
| 555 997 A2 | 8/1993 | (EP) . |
| 565 849 A2 | 10/1993 | (EP) . |
| 569 195 A3 | 11/1993 | (EP) . |
| 625 750 A2 | 11/1994 | (EP) . |
| 635 792 A2 | 1/1995 | (EP) . |
| 651 328 A1 | 5/1995 | (EP) . |
| 660 231 A2 | 6/1995 | (EP) . |
| 697 655 A2 | 2/1996 | (EP) . |
| 718 761 A1 | 6/1996 | (EP) . |
| 767 432 A2 | 4/1997 | (EP) . |
| 778 520 A2 | 6/1997 | (EP) . |
| 794 493 A2 | 9/1997 | (EP) . |
| 2 253 079 | 8/1992 | (GB) . |
| 2 305 087 | 3/1997 | (GB) . |
| WO 92/07335 A1 | 4/1992 | (WO) . |
| WO 92/09948 A1 | 6/1992 | (WO) . |
| WO 94/03855 A1 | 2/1994 | (WO) . |
| WO 96/03692 A1 | 2/1996 | (WO) . |
| WO 96/10787 A1 | 4/1996 | (WO) . |
| WO 96/18947 A1 | 6/1996 | (WO) . |
| WO 96/24099 A1 | 8/1996 | (WO) . |
| WO 98/02814 A1 | 1/1998 | (WO) . |
| WO 98/04971 A1 | 2/1998 | (WO) . |

OTHER PUBLICATIONS

Beech et al., "Object Databases as Generalizations of Relational Databases," Computer Standards & Interfaces, vol. 13, Nos. 1/3, pp. 221–230, Amsterdam, NL, Jan. 1991.

Bertino et al., "Object–Oriented Database Management Systems: Concepts and Issues," Computer, vol. 24, No. 4, pp. 33–47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Implementing Remote Procedure Cells," ACM Transactions on Computer Systems, vol. 2, No. 1, pp. 39–59, Feb. 1984.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, vol. 34, No. 10, pp. 34–48, Oct. 1, 1991.

Drexler et al., "Incentive Engineering for Computational Resource Management," The Ecology of Computation, Elsevier Science Publishers B.V., pp. 231–266, 1988.

Droms, "RFC 1541 Dynamic Host Configuration Protocol," <http://www.cis.ohio—state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Gosling et al., "The Java (TM) Language Specification," Addison–Wesley, 1996.

Gottlob et al., "Extending Object–Oriented Systems with Roles," ACM Transactions On Information Systems, vol. 14, No. 3, pp. 268–296, Jul. 1996.

Hamilton et al., "Subcontract: A Flexible Base For Distributed Programming," Proceedings of 14th Symposium of Operating System Principles, Dec. 1993.

Hartman et al., "Liquid Software: A New Paradigm For Networked Systems," Technical Report 96–11, Department of Comp. Sci., Univ. of Arizona, Jun. 1996.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM, "Chapter 6—Distributed SOM (DSOM)," SOMobjects Developer Toolkit Users Guide, Version 2.1, pp. 6–1–6–90, Oct. 1994.

Jones et al., "Garbage Collection: Algorithms for Automatic Dynamic Memory Management," pp. 165–175, John Wiley & Sons, 1996.

Kay et al., "An Overview of the Raleigh Object–Oriented Database System," ICL Technical Journal, vol. 7, No. 4, pp. 780–798, Oxford, GB, Nov. 1991.

Kougiouris et al., "Support for Space Efficient Object Invocation in Spring," Sep. 1994.

Lindholm et al., "The Java (TM) Virtual Machine Specification," Addison Wesley, 1996.

Mitchell et al., "An Overview of the Spring System," Feb. 1994.

Orfali et al., "The Essential Distributed Objects Survival Guide," Chapter 11: Corba Commercial ORBs, pp. 203–215, John Wiley & Sons, Inc., 1996.

Riggs et al., "Pickling State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Waldo et al., "Events in An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Mullender, *Distributed Systems*, Second Edition, Addison–Wesley, 1993.

Howard et al., Scale and Performance in a Distributed File System, ACM Transactions on Computer Systems, vol. 6, No. 1, Feb. 1988, pp. 51–81.

Cardelli, *Obliq, A lightweight language for network objects*, Nov. 5, 1993, pp. 1–37.

Dijkstra, Self–stabilizing Systems in Spite of Distributed Control, Communications of the ACM, vol. 17, No. 11, Nov. 1974, pp. 643–644.

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1194–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

*Transparent Network Computing*, Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., *Long Term Distributed File Reference Tracing: Implementation and Experience*, Carnegie Mellon University School of Computer Science, Nov. 1994, pp. 1–28.

Gelernter et al., *Parallel Programming in Linda*, Yale University, Jan. 1985, pp. 1–21.

Cannon et al., Adding Fault–Tolerant Transaction Processing to LINDA, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Pinakis, *Using Linda as the Basis of an Operating System Microkernel*, University of Western Australia, Department of Computer Science, Aug. 1993, pp. 1–165.

LINDA Database Search, Jul. 20, 1995, pp. 1–68.

Carriero et al, Distributed Data Structures in Linda, Yale Research Report YALEU/DCS/RR–438, Nov. 1985.

Agha et al., Actorspaces: An Open Distributed Programming Paradigm, University of Illinois, Report No. UIUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp. 1–23.

Liskov et al., *Distributed Object Management in Thor*, International Workshop on Distributed Object Management, 1992, pp. 12.

Coulouris et al., *Distributed Systems Concepts and Designs*, Second Edition, Addison–Wesley, 1994.

Birrell et al., Network Objects, DEC SRC Research Report 115, Feb. 28, 1994.

Birrell et al., Distributed Garbage Collection for Network Objects, DEC SRC Research Report 116, Dec. 15, 1993.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Hamilton, Java and the Shift to Net–Centric Computing Computer, Aug. 1996, pp. 31–39.

Chung et al., A 'Tiny' Pascal Compiler: Part 1: The P–Code Interpreter, BYTE Publications, Inc., Sep. 1978.

Chung et al., A 'Tiny' Pascal Compiler: Part 2: The P–Compiler, Byte Publications, Inc., Oct. 1978.

Thompson, Regular Expression Search Algorithm, Communications of the ACM, vol. II, No. 6, p. 149 et seq., Jun. 1968.

Mitchell et al., *Mesa Language Manual*, Xerox Corporation.

McDaniel, *An Analysis of a Mesa Instruction Set*, Xerox Corporation, May 1982.

Pier, *A Retrospective on the Dorado, A High–Performance Personal Computer*, Xerox Corporation, Aug. 1983.

Pier, A Retrospective on the Dorado, A High–Performance Personal Computer, IEEE Conference Proceedings, The 10th Annual international Symposium on Computer Architecture, 1983.

Krasner, The Smalltalk–80 Virtual Machine, BYTE Publications, Inc., Aug. 1991, pp. 300–320.

Birrell, *Operating Systems Review*, ACM Press, vol. 27, No. 5, Dec. 1993, pp. 217–230.

Remote Method Invocation Specification, Sun Microsystems, Inc., (1997), http://java.sun.com/products/jdk/1.1/docs/guide/rmi/spec/rmiTOC.doc.html.

* cited by examiner

DEFERRED RECONSTRUCTION OF OBJECTS AND REMOTE LOADING IN A DISTRIBUTED SYSTEM

FIELD OF THE INVENTION

The present invention relates to a system and method for transmitting objects between machines in a distributed system.

BACKGROUND OF THE INVENTION

Distributed applications which concentrate on point-to-point data transmission can often be adequately and efficiently handled using special-purpose protocols for remote terminal access and file transfer. Such protocols are tailored specifically to the one application and do not provide a foundation on which to build a variety of distributed applications (e.g., distributed operating systems, electronic mail systems, computer conferencing systems, etc.).

While conventional transport services can be used as the basis for building distributed applications, these services exhibit many organizational problems, such as the use of different data types in different machines, synchronization, and the provision of a simple programming paradigm.

Distributed systems usually contain a number of different types of machines interconnected by communications networks. Each machine has its own internal data types, its own address alignment rules, and its own operating system. This heterogeneity causes problems when building distributed systems. As a result, application developers must include in applications developed for such heterogeneous distributed systems the capability of dealing with partial failures of the distributed system and providing adequate process synchronization.

However, one simplification is afforded by noting that a large proportion of applications use a request and response interaction between processes where the initiator (i.e., application initiating a communication) is idle until the response is returned. This can be modelled by a procedure call mechanism between processes. One such mechanism is referred to as the remote procedure call (RPC).

An RPC mechanism permits a language level call on one machine to be turned automatically into a language level call in a process (i.e., application) on another machine. (The RPC mechanism may also be used between applications running on the same machine.)

The RPC is a mechanism for providing synchronized type-safe communication between two processes. In the simplest case, one process, i.e., a client application, sends a message to another process, i.e., a server application. In this case it is not necessary for the processes to be synchronized either when the message is sent or received. It is possible for the client application to transmit the message and then begin a new activity, or for the server application's environment to buffer the incoming message until the server application is ready to process a new message. RPC, however, imposes constraints on synchronism because it closely models the local procedure call, which requires passing parameters in one direction, blocking the calling process (i.e., the client application) until the called procedure (i.e., the server application) is complete, and then returning a response. RPC thus involves two message transfers, and the synchronization of the two processes for the duration of the call.

The RPC mechanism is usually implemented in two processing parts using the local procedure call paradigm, one part being on the client side and the other part being on the server side. Both of these parts will be described below with reference to FIG. 1.

FIG. 1 is a diagram illustrating the flow of call information using an RPC mechanism. As shown in FIG. 1, a client application 100 issues a call (step 102). The RPC mechanism 101 then packs the call as arguments of a call packet (step 103), which the RPC mechanism 101 then transmits to a server application 109 (step 104). The call packet is used to identify the client application 100 that first sent the call. After the call packet is transmitted (step 104), the RPC mechanism 101 enters a wait state during which it waits for a response from the server application 109.

The RPC mechanism 108 for the server application 109 (which may be the same RPC mechanism as the RPC mechanism 101 when the server application 109 is on the same platform as the client application 100) receives the call packet (step 110), unpacks the arguments of the call from the call packet (step 111), identifies, using the call arguments, the server application 109 to which the call was addressed, and provides the call arguments to the server application 109.

The server application receives the call (step 112), processes the call (step 115), and returns a response to the RPC 108 (step 116). The RPC 108 then packs the response in a response packet (step 114) and transmits it to the client application 100 (step 113).

Receiving the response packet (step 107) triggers the RPC mechanism 101 to exit the waft state and unpack the response from the response packet (step 106). The RPC 101 then provides the response to the client application 100 in response to the call (step 105). This is the process flow of the typical RPC mechanism modelled after the local procedure call paradigm. Since the RPC mechanism uses the local procedure call paradigm, the client application 100 is blocked at the call until a response is received. Thus, the client application 100 does not continue with its own processing after sending the call; rather, it waits for a response from the server application 109.

Synchronization between client and server applications tends to waste processing cycles. Accordingly, asynchronous communication is the preferred method for communicating among applications in a distributed system.

The Java™ programming language is an object-oriented programming language that is described, for example, in a text entitled "The Java Language Specification" by James Gosling, Bill Joy, and Guy Steele, Addison-Wesley, 1996. This language is typically compiled to a universal executable format, using a "bytecode instruction set," which can be executed on any platform supporting the Java virtual machine (JVM). The JVM is described, for example, in a text entitled "The Java Virtual Machine Specification," by Tim Lindholm and Frank Yellin, Addison Wesley, 1996. Because the JVM may be implemented on any type of platform, implementing distributed applications using the JVM significantly reduces the difficulties associated with developing applications for heterogenous distributed systems. Moreover, the JVM uses a Java remote method invocation (RMI) that enables synchronous communication among applications of the system.

FIG. 2 is a diagram illustrating the flow of objects in an object-oriented distributed system 200 including machines 201 and 202 for transmitting and receiving objects using the JVM. In network 200 machine 201 uses RMI 205 for responding to a call for object 203 by converting the object into a byte stream 207 including an identification of the type of object transmitted and data constituting the object. Java RMIs are known in the art and an exemplary explanation is available from Sun Microsystems, Inc. and is also currently available via the Internet at the address "http://java.sun.com/products/jdk/rmi/index.html." While machine 201 is responding to the call for object 203, a process running on the same or another machine in system 200 may continue operation without waiting for a response to its request.

Machine 202 receives the byte stream 207. Using RMI 206, machine 202 automatically converts it into the corresponding object 204, which is a copy of object 203 and which makes the object available for use by an application executing on machine 202. Machine 202 may also transmit the object to another machine by first converting the object into a byte stream and then sending it to the third machine, which also automatically converts the byte stream into the corresponding object.

The automatic reconstruction of the objects from the byte stream in this manner sometimes requires unnecessary processing. For example, there are times when a call is made that does not require actual or immediate interaction with the object, both of which require conversion of the byte stream to object form. Instead, a call may require passing the object to another call or storing it for later use. In this situation, the reconstruction of the object on an intermediate machine is unnecessary, especially if the object is to be transmitted to another machine. Accordingly, it is desirable to more efficiently transmit objects in a distributed system without the unneeded conversion of a byte stream to an object on intermediate machines that have no use for the object, or the premature conversion of the byte stream before a process on the receiving machine requires access to the object.

SUMMARY OF THE INVENTION

In accordance with the present invention, as embodied and broadly described herein, a method for transmitting objects in a distributed system having multiple machines, comprises specifying an object to be converted into a stream containing a self-describing form of the object. The stream is sent to one of the machines for selective transmission to another machine where the object may be reconstructed by accessing program code identified in the stream.

Another method consistent with the present invention processes objects in a distributed system comprised of multiple machines. A stream containing a self-describing form of a object is received at a machine. It determines whether to send the stream to another machine. The stream is sent to the other machine for reconstruction of the object by accessing program code identified in the stream.

Another method consistent with the present invention transmits objects in a distributed system comprised of multiple machines. An object is specified and converted into a stream containing a self-describing form of the object. The stream is sent to one of the machines for selective transmission to another machine. The object is reconstructed from the stream by accessing the program code identified in the stream.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Systems consistent with the present invention efficiently transfer objects using a variant of an RPC or RMI passing arguments and return values from one process to another process, which may be on different physical machines. In such cases, it is desirable to defer reconstruction of the object and downloading of code associated with such object reconstruction until it is needed by the program. The "machines" may also be virtual machines on the same physical machine. Examples of RPC systems include distributed computed environment (DCE) RPC, Sun Microsystems external data representation (Sun XDR), and Microsoft distributed common object model (DCOM) RPC.

An example of how this is accomplished is by making a self-describing stream a first-class entity in the system, meaning that it exists within a type system of a programming language and can be accessed and manipulated by instructions written in that language. A stream is typically a sequence of characters, such as a bit pattern, capable of transmission. A self-describing byte stream is a byte stream that contains enough information such that it can be converted back into the corresponding object.

An object called a "marshalled object" comprises the self-describing stream. Such marshalled objects can typically be produced from any object that can be passed from one address space to another, and they can be stored, passed to other objects, or used to reconstruct an object of the original type on demand. The advantage of using marshalled objects is that the reconstruction of an object is deferred until a process having access to the marshalled object directly invokes the creation of the object using the marshalled object. Any downloading of code required to operate on the object is deferred until the marshalled object is used to create a copy of the original object, which was previously used to produce the marshalled object.

Accordingly, in cases where the object is not used, but rather is stored for later retrieval or passed along to another process, the RMI does not download the code required for reconstruction of the object. This may result in considerable efficiencies, both in time and in code storage space.

Distributed Processing Systems

Figure 1:
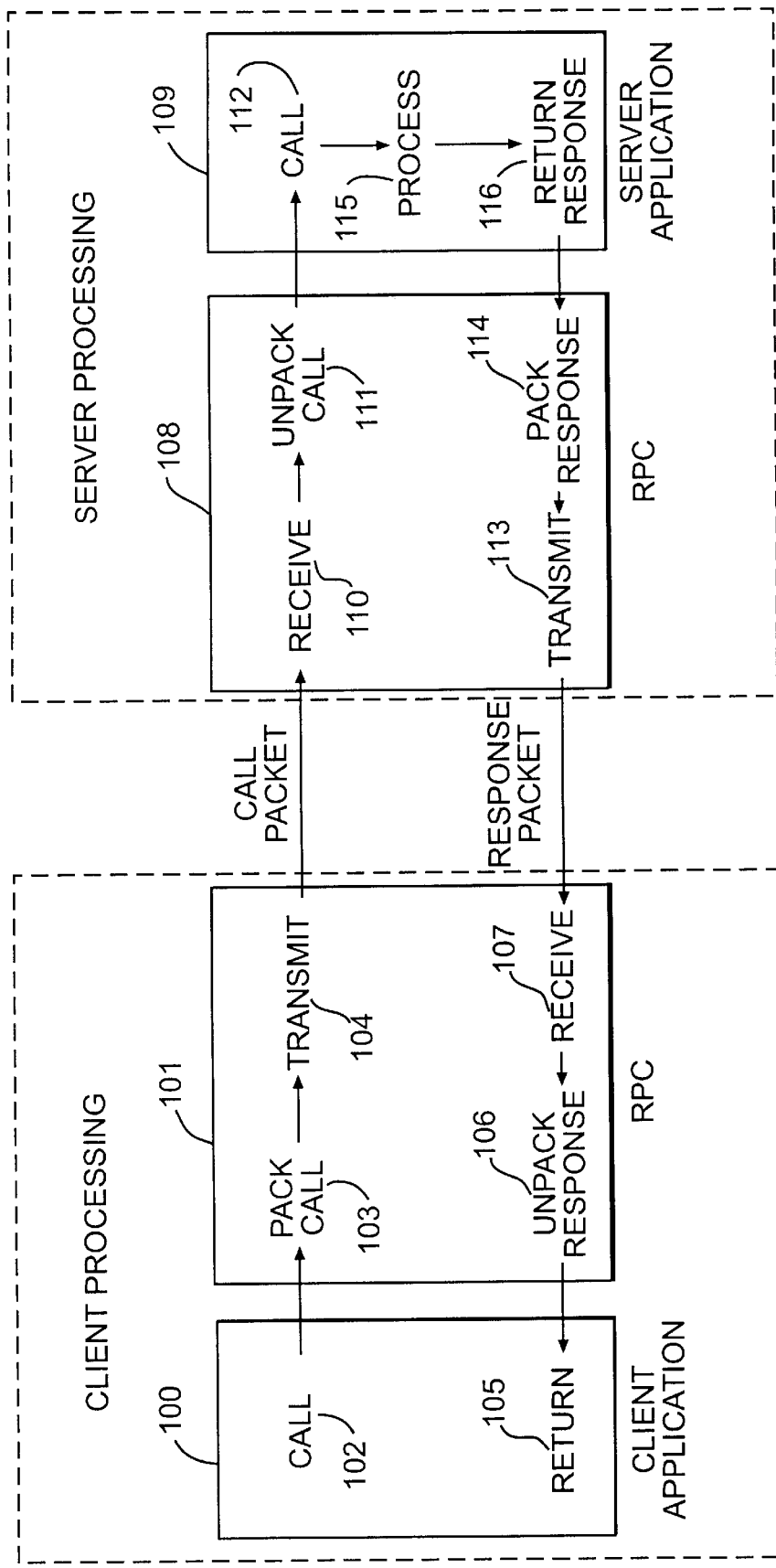
FIG. 1 is a diagram illustrating the flow of call information using an RPC mechanism.
Figure 2:
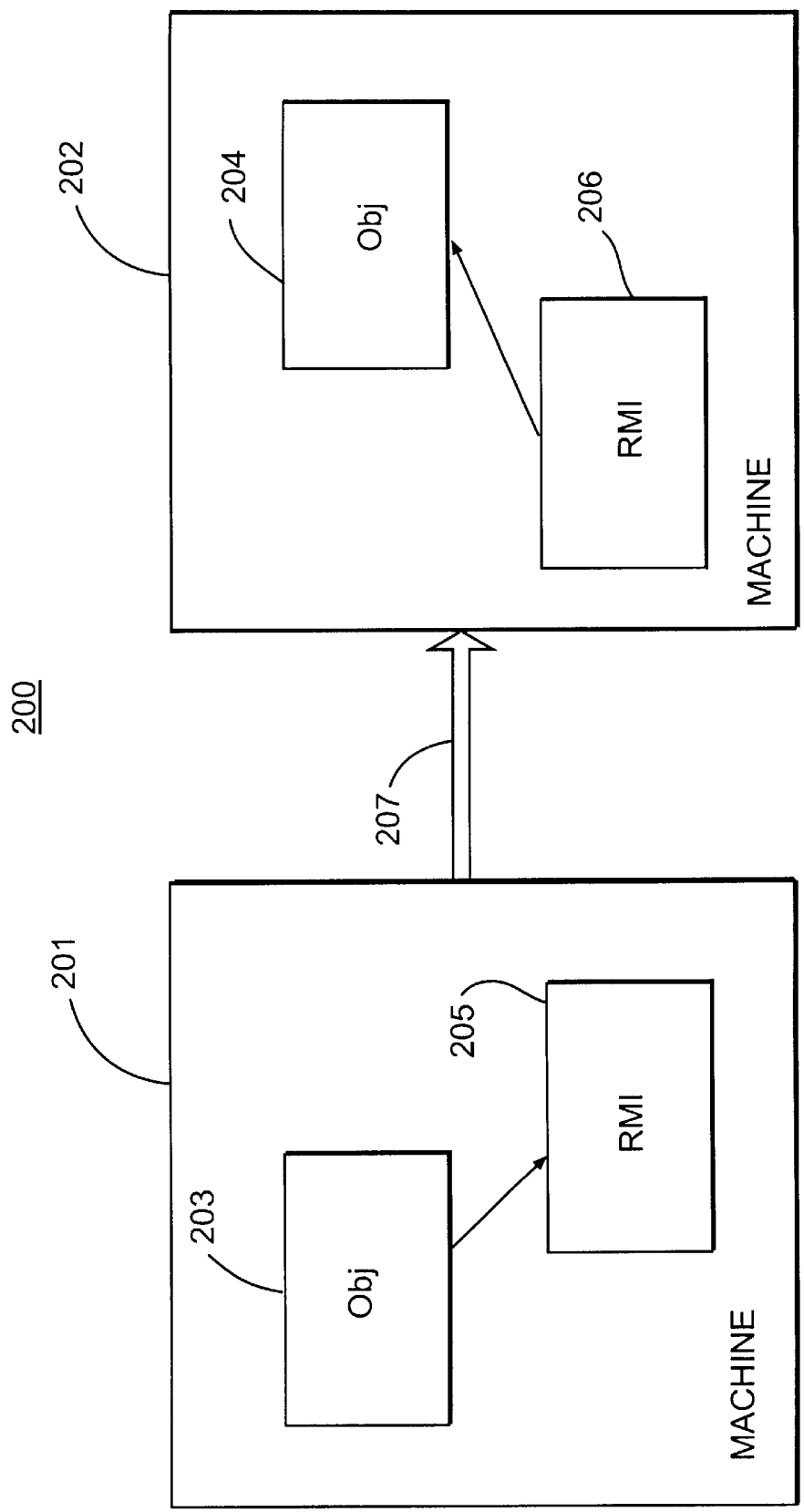
FIG. 2 is a diagram illustrating the transmission of objects in an object-oriented distributed system.
Figure 3:
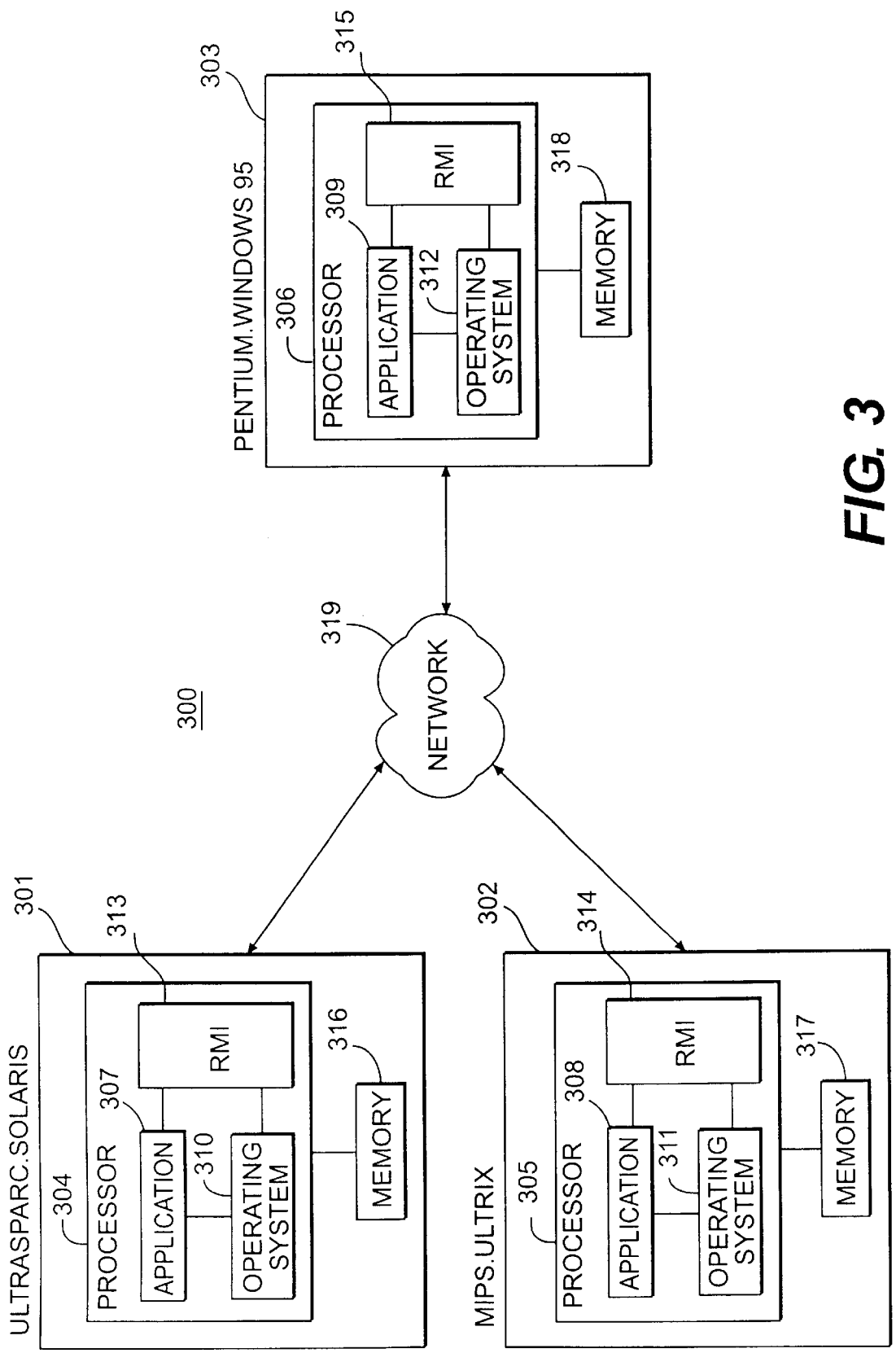
FIG. 3 is a diagram of a distributed processing system that can be used in an implementation consistent with the present invention.

FIG. 3 illustrates a distributed processing system 300 which can be used in an implementation consistent with the present invention. In FIG. 3, distributed processing system 300 contains three independent and heterogeneous platforms 301, 302, and 303 connected in a network configuration represented by network cloud 319. The composition and protocol of the network configuration represented by cloud 319 is not important as long as it allows for communication of the information between platforms 301, 302 and 303. In addition, the use of just three platforms is merely for illustration and does not limit an implementation consistent with the present invention to the use of a particular number of platforms. Further, the specific network architecture is not crucial to this invention. For example, another network architecture that could be used in an implementation consistent with this invention would employ one platform as a network controller to which all the other platforms would be connected.

In the implementation of distributed processing system 300, platforms 301, 302 and 303 each include a processor 304, 305, and 306 respectively, and a memory, 316, 317, and 318, respectively. Included within each processor 304, 305, and 306, are applications 307, 308, and 309, respectively, operating systems 310, 311, and 312, respectively, and RMI components 314, 315, and 316, respectively.

Applications 307, 308, and 309 can be programs that are either previously written and modified to work with, or that are specially written to take advantage of, the services offered by an implementation consistent with the present invention. Applications 307, 308, and 309 invoke operations to be performed in accordance with an implementation consistent with this invention.

Operating systems 310, 311, and 312 are typically standard operating systems tied to the corresponding processors 304, 305, and 306, respectively. The platforms 301, 302, and 303 can be heterogenous. For example, platform 301 has an UltraSparc® microprocessor manufactured by Sun Microsystems, Inc. as processor 304 and uses a Solaris® operating system 310. Platform 302 has a MIPS microprocessor manufactured by Silicon Graphics Corp. as processor 305 and uses a Unix operating system 311. Finally, platform 303 has a Pentium microprocessor manufactured by Intel Corp. as processor 306 and uses a Microsoft Windows 95 operating system 312. An implementation consistent with the present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 316, 317, and 318 serve several functions, such as general storage for the associated platform. Another function is to store applications 307, 308, and 309, RMI components 313, 314, and 315, and operating systems 310, 311, and 312 before execution by the respective processor 304, 305, and 306. In addition, portions of memories 316, 317, and 318 may constitute shared memory available to all of the platforms 301, 302, and 303 in network 300.

Data Flow in a Distributed Processing System

Figure 4:
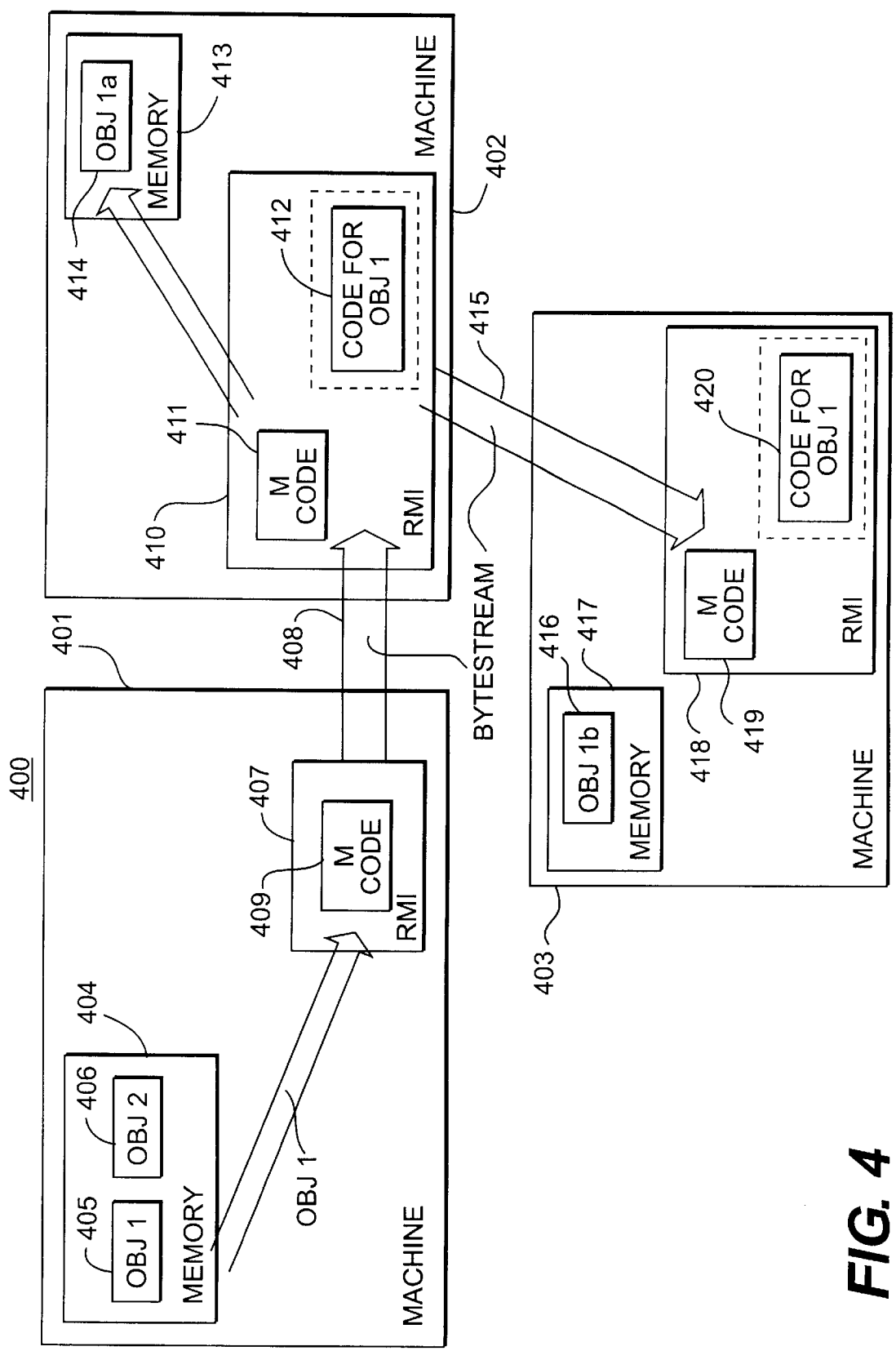
FIG. 4 is a diagram of a flow of objects within a distributed processing system consistent with the present invention.

FIG. 4 is a diagram of an object-oriented distributed system 400 connecting machines 401, 402, and 403, such as computers or virtual machines executing one or more computers, or the machines described with reference to FIG. 3. Transmitting machine 401 includes a memory 404 storing objects such as objects 405 and 406, and an RMI 407 for performing processing on the objects. To transmit an object over network 400, RMI 407 uses code 409 for converting object 405 into a marshalled object that is transmitted as a byte stream 408 to machine 402. Java streams, including input and output streams, are known in the art and an explanation, which is incorporated herein by reference, appears in, for example, a text entitled "The Java Tutorial: Object-Oriented Programming for the Internet," pp. 325–53, by Mary Campione and Kathy Walrath, Addison-Wesley, 1996.

Part of this conversion includes adding information so that a receiving machine 402 can reconstruct the object. When a set of object types is limited and is the same on all machines 401, 402, and 403, a receiving machine typically requires the object's state and a description of its type because the object's code is already present on all network machines. Alternatively, machine 401 uses RMI 407 to provide more flexibility, allowing code to be moved when necessary along with information or the object's state and type. Additionally, a transmitting machine includes in the marshalled object an identification of the type of object transmitted, the data constituting the state of the object, and a network-accessible location in the form of a universal resource locator (URL) for code that is associated with the object. Java URLs are known in the art and an explanation, which is incorporated herein by reference, appears in, for example, a text entitled "The Java Tutorial: Object-Oriented Programming for the Internet," pp. 494–507, by Mary Campione and Kathy Walrath, Addison-Wesley, 1996.

When receiving machine 402 receives byte stream 408, it identifies the type of transmitted object. Machine 402 contains its own RMI 410 and code 411 for processing of objects. If byte stream 408 contains a marshalled object, machine 402 may create a new object 414 using the object type identified in the marshalled object, the state information, and code for the object. Object 414 is a copy of object 405 and is stored in memory 413 of machine 402. If code 412 is not resident or available on machine 402 and the marshalled object does not contain the code, RMI 410 uses the Java URL from the marshalled object to locate the code and transfer a copy of the code to machine 402. Because the code is Java bytecodes and is therefore portable, the receiving machine can load the code into RMI 410 to reconstruct the object. Thus, machine 402 can reconstruct an object of the appropriate type even if that kind of object has not been present on the machine before.

Machine 402 may also convert object 414 into byte stream 415 for transmission to a third machine 403, which contains its own RMI 418 and code 419 for processing objects. RMI 418, using code 420 for the object, converts byte stream 415 into a corresponding object 416, which it stores in memory 417. Object 416 is a copy of object 405. If code 420 for the object is not resident or available, machine 403 requests the code from another machine using the URL, as described above.

Machine 402 may alternatively store the marshalled object as a byte stream without reconstructing the object. It may then transmit the byte stream to machine 403.

Marshalled Object

A marshalled object is a container for an object that allows that object to be passed as a parameter in an RMI call, but preferably postpones conversion of the marshalled object at the receiving machine until an application executing on the receiving machine requests the object via a call to the marshalled object. A container is an envelope that includes the data and either the code or a reference to the code for the object, and that holds the object for transmission. The serializable object contained in the marshalled object is typically serialized and deserialized when requested with the same semantics as parameters passed in RMI calls. Serialization is a process of converting an in-memory representation of an object into a corresponding self-describing byte stream. Deserialization is a process of converting a self-describing byte stream into the corresponding object.

To convert an object into a marshalled object, the object is placed inside a marshalled object container and when a URL is used to locate code for the object, the URL is added to the container. Thus, when the contained object is retrieved from its marshalled object container, if the code for the object is not available locally, the URL added to the container is used to locate and load Java bytecodes for the object's class.

The following is an exemplary class definition for a marshalled object for the Java class file consistent with the present invention:

```
package java.rmi;
public final class MarshalledObject implements java.io.Serializable
{
    public MarshalledObject (Object obj)
        throws java.io.IoException;
    public Object get ()
        throws java.io.IOExeception, ClassNotFoundException;
    public int hashCode ();
    public boolean equals();
}
```

A marshalled object may be embodied within an article of manufacture specifying a representation of the object stored in a computer-readable storage medium.

A marshalled object's constructor takes a serializable object (obj) as its single argument and holds the marshalled representation of the object in a byte stream. The marshalled representation of the object preserves the semantics of objects that are at passed in RMI calls: each class in the stream is typically annotated with either the object's code or a URL to the code so that when the object is reconstructed by a call to a "get" method, the bytecodes for each class can be located and loaded, and remote objects are replaced with their proxy stubs. The "get" method is a method called by an application to execute a process of unmarshalling, which is reconstruction of an object from a marshalled object using a self-describing byte stream (the marshalled object), and a process to obtain the necessary code for that process. A proxy stub is a reference to a remote object for use in reconstructing an object.

When an instance of the class marshalled object is written to a "java.io.ObjectOutputStream," the contained object's marshalled form created during construction is written to the stream. Thus, only the byte stream is serialized.

When a marshalled object is read from a "java.io.ObjectInputStream," the contained object is not deserialized into a new object. Rather, the object remains in its marshalled representation until the marshalled object's get method is called.

The get method preferably always reconstructs a new copy of the contained object from its marshalled form. The internal representation is deserialized with the new semantics used for unmarshalling parameters for RMI calls. Thus, the deserialization of the object's representation loads class codes, if not available locally, using the URL annotation embedded in the serialized stream for the object.

As indicated in the class definition for a marshalled object, the hash code of the marshalled representation of an object is defined to be equivalent to the hash code for the object itself. In general, a hash code is used in hash tables to perform fast look-ups of information, which is known in the art. The equals method will return true if the a marshalled representation of the objects being compared are equivalent. An equals method verifies reconstruction by determining if a reconstructed object is the same as the original object, and such methods are known in the Java programming language.

Transmission of a Marshalled Object

Figure 5:
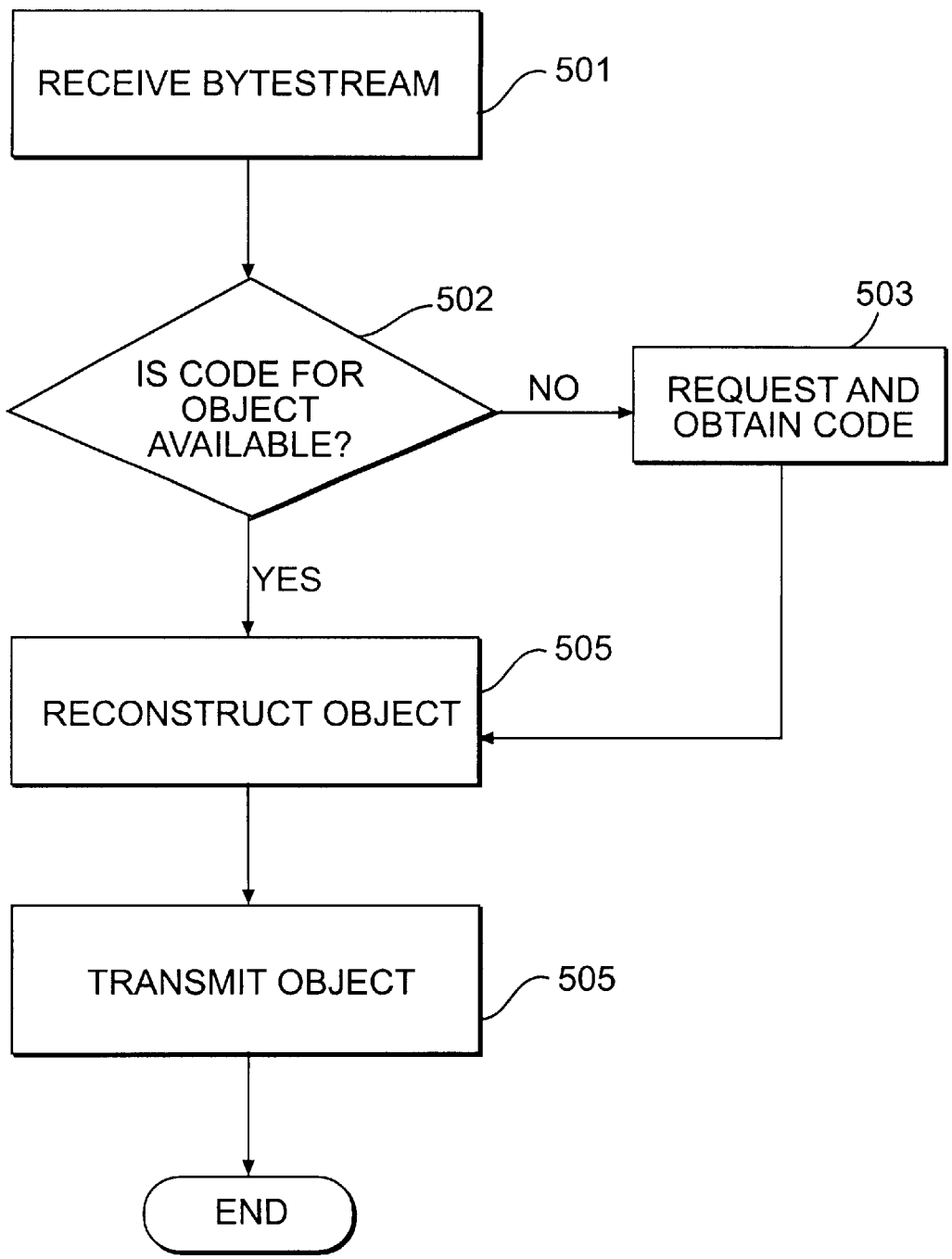
FIG. 5 is a flow diagram of steps performed in transmitting objects in a distributed system using loading of remote code for construction of an object in an implementation consistent with the present invention.

FIG. 5 is a flow diagram of steps 500 preferably performed in transmitting objects in a distributed system consistent with the present invention. A machine receives a byte stream (step 501), which includes data for the object, information identifying the type of object, and optionally a URL for the code that is associated with the object. The receiving machine determines if the code for the object is resident or available (step 502). If it is available, the machine preferably uses an RMI for reconstructing the object from the byte stream and resident code (step 504). If the code is not resident, the machine uses the URL from the byte stream to request the code from another machine located at a network accessible location, and that machine returns a copy of the code (step 503). The object can also be transmitted in the form of a byte stream to another machine (step 505).

Figure 6:
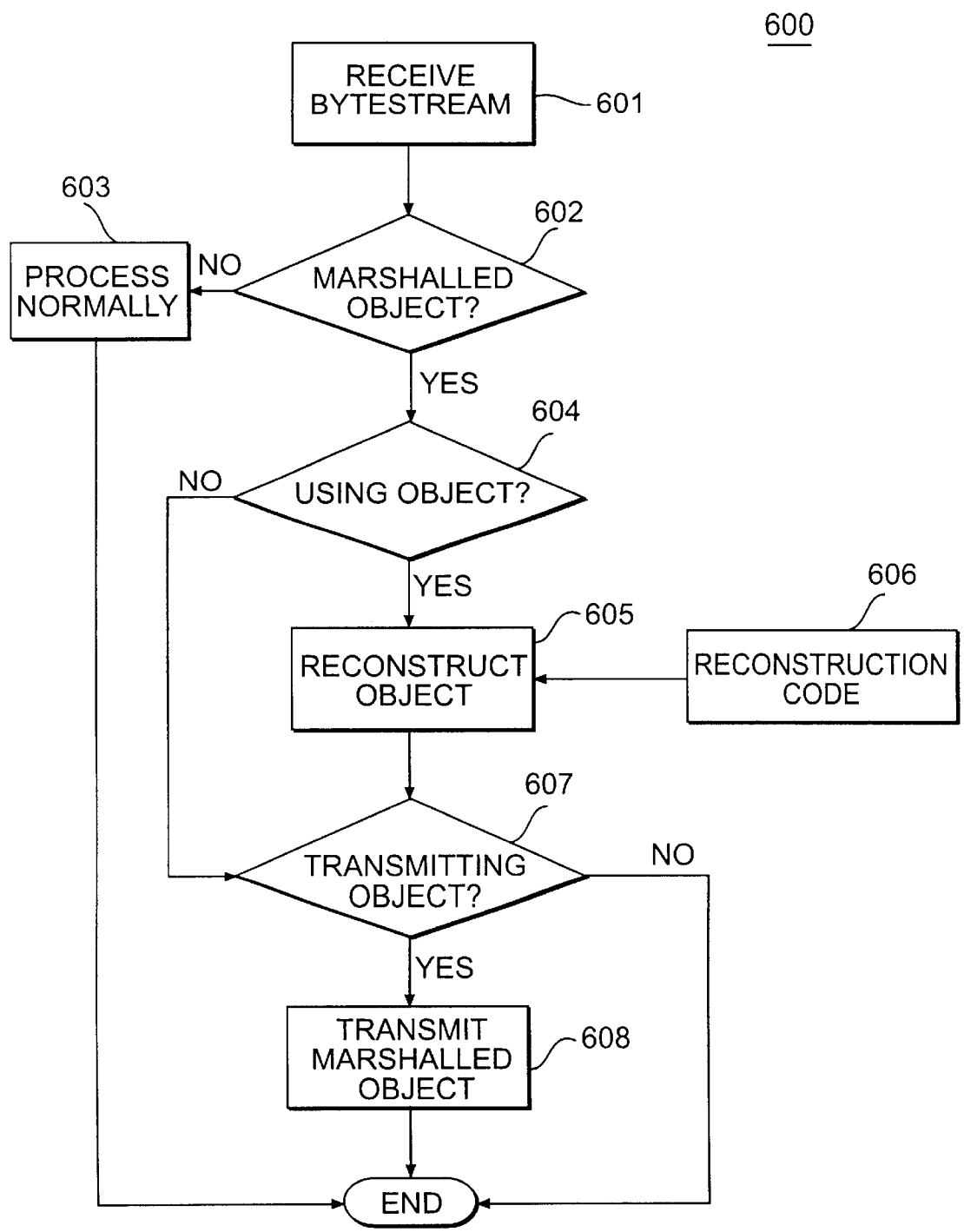
FIG. 6 is a flow diagram of steps performed for deferring code loading and construction of objects when transmitting objects in a distributed system consistent with the present invention.

FIG. 6 is a flow diagram of steps 600 preferably performed for deferring code loading and construction of objects when transmitting marshalled objects in a distributed system consistent with the present invention. A machine receives a byte stream (step 601), which includes data for the object, information identifying the type of object, and optionally a URL for the code that is associated with the object.

The machine determines if the byte stream is a marshalled object (step 602). If it is not such an object, the machine performs normal processing of the byte stream (step 603). Otherwise, if the received byte stream represents a marshalled object, the machine holds the marshalled object for later use in response to a get method invoked by a process on the receiving machine. If the receiving machine determines that the object is to be transmitted to another machine (step 604), it simply transmits the byte stream without reconstructing the object. If the machine uses the object, it performs reconstruction of the object using its RMI and associated code (step 605). If the reconstruction code for the object is not resident on the machine, it uses a URL to request and obtain the code (step 606), as described above. The machine determines if it needs to transmit the object to another machine (step 607). If the object is destined for another machine, it is transmitted as a byte stream (step 608).

Accordingly, a marshalled object provides for more efficient transfer of objects in a distributed system. If an object is needed by a machine, it can be reconstructed, and if the machine does not need to use the object, it can transmit the marshalled object without reconstructing it.

Machines implementing the steps shown in FIGS. 4 and 5 may include computer processors for performing the functions, as shown in FIG. 3. They may include modules or programs configured to cause the processors to perform the above functions. They may also include computer program products stored in a memory. The computer program products may include computer-readable media having computer-readable code embodied therein for causing the machines to perform functions described above.

Although the illustrative embodiments of the systems consistent with the present invention are described with reference to a computer system implementing the Java programming language on the JVM specification, the invention is equally applicable to other computer systems processing code from different programming languages. Specifically, the invention may be implemented with both object-oriented and nonobject-oriented programming systems.

While the present invention has been described in connection with a preferred embodiment thereof, it will be understood that many modifications will be readily apparent to those skilled in the art, and this application is intended to cover any adaptations or variations thereof. For example, different labels or definitions for the marshalled object may be used without departing from the scope of the invention. It is manifestly intended that this invention be limited only by the claims and equivalents thereof.

What is claimed is:

1. A method for transmitting objects in a distributed system comprised of multiple machines, each with an RPC mechanism, the method comprising the steps of:

specifying an object;

converting the object into a stream containing a self-describing form of the object; and sending the stream to an RPC mechanism on one of the machines such that reconstruction of the object is deferred until the stream is transmitted to another RPC mechanism on another machine whereupon the object may be reconstructed by the other RPC mechanism by accessing program code identified in the stream.

2. The method of claim 1 wherein the converting step includes the step of packaging the object in an unconstructed package including a reference to the program code for reconstructing the object.

3. A method for processing objects in a distributed system comprised of multiple machines, the method comprising the steps of:

receiving at an RPC mechanism on one of the multiple of machines a stream containing a self-describing form of an object; and while the object remains in the form of the stream, performing the steps of:

determining whether to send the stream to another RPC mechanism on another machine by the RPC mechanism; and sending the stream to the other RPC mechanism on the other machine for reconstruction of the object by the other RPC mechanism accessing program code identified in the stream.

4. A method for transmitting objects in a distributed system comprised of multiple machines, each with an RPC mechanism, the method comprising the steps of:

specifying an object;

converting the object into a stream containing a self-describing form of the object;

sending the stream to an RPC mechanism on one of the machines such that reconstruction of the object is deferred until the object is transmitted to another RPC mechanism on another machine;

transmitting the stream to the other RPC mechanism on the other machine while the object remains in the form of the stream; and reconstructing the object from the stream by the other RPC mechanism on the other machine by accessing program code identified in the stream.

5. The method of claim 4 wherein the converting step includes the step of packaging the object in an unconstructed package including a reference to the program code for reconstructing the object.

6. An apparatus for transmitting objects in a distributed system comprised of multiple machines, comprising:

a module configured to specify an object;

a converting module configured to convert the object into a stream containing a self-describing form of the object; and a sending module configured to send the stream to an RPC mechanism on one of the machines such that reconstruction of the object is deferred until the stream is transmitted to another RPC mechanism on another machine whereupon the object may be reconstructed by accessing program code identified in the stream.

7. The apparatus of claim 6 wherein the converting module is further configured to package the object in an unconstructed package including a reference to the program code for reconstructing the object.

8. An apparatus for processing objects in a distributed system comprised of multiple machines, comprising:

a receiving module of an RPC mechanism on one of the machines configured to receive a stream containing a self-describing form of an object;

a determining module of the RPC mechanism configured to determine whether to send the stream to another machine while the object remains in the form of the stream; and a sending module of the RPC mechanism configured to send the stream to the other machine while the object remains in the form of the stream, whereupon receipt of the stream by the other machine the object is reconstructed by accessing program code identified in the stream.

9. A computer program product, comprising:

a computer usable medium having computer readable code embodied therein for use in transmitting objects in a distributed system comprised of multiple machines, comprising:

a module configured to specify an object;

a converting module configured to convert the object into a stream containing a self-describing form of the object; and a sending module configured to send the stream to an RPC mechanism on one of the machines such that reconstruction of the object is deferred until the stream is transmitted to another RPC mechanism on another machine whereupon the object may be reconstructed by accessing program code identified in the stream.

10. The computer program product of claim 9 wherein the converting module is further configured to packaging the object in an unconstructed package including a reference to the program code for reconstructing the object.

11. A computer program product, comprising:

a computer usable medium having computer readable code embodied therein for use in processing objects in a distributed system comprised of multiple machines, comprising:

a receiving module of an RPC mechanism on one of the machines configured to receive a stream containing a self-describing form of an object;

a determining module of the RPC mechanism configured to determine whether to send the stream to another machine while the object remains in the form of the stream; and a sending module of the RPC mechanism configured to send the stream to the other machine while the object remains in the form of the stream, whereupon receipt of the stream by the other machine the object is reconstructed by accessing program code identified in the stream.

12. A computer data signal embodied in a carrier wave and representing sequences of instructions which, when executed by a processor, cause the processor to securely address a peripheral device at an absolute address by performing the steps of:

executing a first module of an RPC mechanism to specify an object;

executing a second module of the RPC mechanism to convert the object into a stream containing a self-describing form of the object; and executing a third module of the RPC mechanism to send the stream to one of the machines such that reconstruction of the object is deferred until the stream is transmitted to another machine whereupon the object may be reconstructed by accessing program code identified in the stream.

13. The data signal of claim 12 wherein the second module of the RPC mechanism packages the object in an unconstructed package including a reference to the program code for reconstructing the object.

14. A computer data signal embodied in a carrier wave and representing sequences of instructions which, when executed by a processor, cause the processor to securely address a peripheral device at an absolute address by performing the steps of:

executing a first module of an RPC mechanism to receive at a machine a stream containing a self-describing form of an object;

executing a second module of the RPC mechanism to determine whether to send the stream to another machine while the object remains in the form of a stream; and executing a third module of the RPC mechanism to send the stream to the other machine while the object remains in the form of a stream, whereupon receipt of the object by the other machine the object is reconstructed by accessing program code identified in the stream.

15. An article of manufacture specifying a representation of an object stored in a computer-readable storage medium and capable of electronic transmission between machines in a distributed system, the article of manufacture comprising:

a first object comprising a self-describing stream stored in a computer-readable storage medium, the first object representing a second object and having a property indicating that the first object is to be maintained as the stream when the first object is transmitted between RPC mechanisms on machines in the system unless a particular RPC mechanism requires use of the second object.

16. The article of manufacture of claim 15 wherein the stream includes computer-readable instructions for use in reconstructing the second object.

17. The article of manufacture of claim 15 wherein the stream includes a location of computer-readable instructions for use in reconstructing the second object.

18. A method in a data processing system having a RPC mechanism used by a program, comprising the steps performed by the RPC mechanism of:

receiving an object in a form of a stream from a remote RPC mechanism;

deferring reconstruction of the object until requested to perform reconstruction by the program;

receiving from the program a request to reconstruct the object by the RPC mechanism; and reconstructing the object responsive to receiving the request by the RPC mechanism.

19. In a data processing system, a method for transmitting an object from a first RPC mechanism to a second RPC mechanism that is used by a program, comprising the steps of:

forming a stream out of the object by the first RPC mechanism;

sending the stream to the second RPC mechanism by the first RPC mechanism;

receiving the stream by the second RPC mechanism;

deferring reconstruction of the object by the second RPC mechanism until requested to perform the reconstruction by the program;

receiving from the program a request to reconstruct the object by the second RPC mechanism; and reconstructing the object responsive to receiving the request by the second RPC mechanism.

20. A computer-readable medium containing instructions for controlling a data processing system to perform a method, the data processing system having an RPC mechanism used by a program, the method comprising the steps performed by the RPC mechanism of:

receiving an object in a form of a stream from a remote RPC mechanism;

deferring reconstruction of the object until requested to perform reconstruction by the program;

receiving from the program a request to reconstruct the object by the RPC mechanism; and reconstructing the object responsive to receiving the request by the RPC mechanism.

21. A computer-readable medium containing instructions for controlling a data processing system to perform a method, the method for transmitting an object from a first RPC mechanism to a second RPC mechanism that is used by a program, the method comprising the steps of:

forming a stream out of the object by the first RPC mechanism;

sending the stream to the second RPC mechanism by the first RPC mechanism;

receiving the stream by the second RPC mechanism;

deferring reconstruction of the object by the second RPC mechanism until requested to perform the reconstruction by the program;

receiving from the program a request to reconstruct the object by the second RPC mechanism; and reconstructing the object responsive to receiving the request by the second RPC mechanism.

* * * * *